(12) United States Patent
Meng et al.

(10) Patent No.: US 8,941,881 B2
(45) Date of Patent: Jan. 27, 2015

(54) METHOD AND APPARATUS FOR RASTERIZING TRANSPARENT PAGE

(71) Applicants: Peking University Founder Group Co., Ltd., Beijing (CN); Beijing Founder Electronics Co., Ltd., Beijing (CN)

(72) Inventors: Zhangwei Meng, Beijing (CN); Ken Chen, Beijing (CN); Hao Lin, Beijing (CN)

(73) Assignees: Peking University Founder Group Co., Ltd., Beijing (CN); Beijing Founder Electronics Co., Ltd., Beijing (CN)

( * ) Notice: Subject to any disclaimer, the term of this patent is extended or adjusted under 35 U.S.C. 154(b) by 59 days.

(21) Appl. No.: 13/732,285

(22) Filed: Dec. 31, 2012

(65) Prior Publication Data

US 2013/0169983 A1    Jul. 4, 2013

(30) Foreign Application Priority Data

Dec. 31, 2011    (CN) .......................... 2011 1 0460603

(51) Int. Cl.
G06F 15/00    (2006.01)
G06K 1/00    (2006.01)
G06K 15/02    (2006.01)
G06T 11/60    (2006.01)

(52) U.S. Cl.
CPC ............ G06K 15/1836 (2013.01); G06T 11/60 (2013.01); G06K 15/1852 (2013.01)
USPC ........................................................ 358/1.9

(58) Field of Classification Search
None
See application file for complete search history.

(56) References Cited

U.S. PATENT DOCUMENTS 7,095,527 B2 *    8/2006    Ahrens ........................ 358/1.18
2010/0053705 A1 *    3/2010    Huang et al. .................. 358/487

* cited by examiner

*Primary Examiner* — Benny Q Tieu
*Assistant Examiner* — Michael Burleson
(74) *Attorney, Agent, or Firm* — Finnegan, Henderson, Farabow, Garrett & Dunner, LLP

(57) ABSTRACT

A method for rasterizing a transparent page comprises interpreting the transparent page to obtain graphic entities, transparency properties of the graphic entities, and profile information of the graphic entities; dividing the transparent page into a transparent area and a nontransparent area according to the transparency properties of the graphic entities; identifying, from the graphic entities, an overlapping graphic entity having an overlapping portion with the transparent area according to the profile information of the graphic entities; and dividing the transparent area into a de-transparentizing area and an ultimate transparent area by using the overlapping graphic entity.

17 Claims, 8 Drawing Sheets

METHOD AND APPARATUS FOR RASTERIZING TRANSPARENT PAGE

RELATED APPLICATIONS

This application claims the benefit of Chinese Patent Application No. 201110460603.6, filed Dec. 31, 2011, the entire contents of which are incorporated herein by reference.

FIELD

The present disclosure relates to rasterization and, more particularly, to a method and apparatus for rasterizing a transparent page.

BACKGROUND

A raster image processor (RIP) is a unit for interpreting and converting layout information described in a page description language into data information that can be output by an output equipment. For example, an RIP may interpret and convert graphic entities in PDF (Portable Document Format) format into data that can be output by the output equipment. RIP is a core software of the pre-printing industry, which may determine the output speed of a desktop system.

Two imaging models are usually used for drawing page graphic entities by the RIP: substitute imaging model and transparent imaging model. In the substitute imaging model, a graphic entity newly drawn in a page completely substitutes for a background content at a position of the graphic entity, where the background content may be a graphic entity previously drawn in the page. The final colors of points at this position are determined by the graphic entity finally drawn at this position. In the transparent imaging model, a transparent graphic entity newly drawn in a page is subjected to transparent computing with a background content at the position of the graphic entity. That is, the final colors of points at this position are determined by all the graphic entities drawn at the position.

A PDF format is an electronic document format for describing page contents. From version 1.4 of PDF, transparency concept and transparent imaging model are introduced. A PDF page can support various special effects such as transparency, gradient, feathering, and etc.

RIP can interpret and convert the layout information described in a PDF page description language into 1-bit format data or 8-bit format data for output. The 1-bit or 8-bit refers to a number of bits of a color value of a color component of a pixel. For example, if four colors, such as C, M, Y, and K, are used to represent the color of one pixel, when RIP performs 1-bit data output, 4-bit data is required in total, i.e., ½ byte; while when RIP performs 8-bit data output, 32-bit data is required in total, i.e., 4 bytes. If an output equipment requires 1-bit output, under the substitute imaging model, a graphic entity to be drawn is first screened to generate 1-bit data, and the 1-bit data is drawn to an ultimately-output 1-bit page dot matrix. Under the transparent imaging model, if a graphic entity to be drawn is first screened, the resulting 1-bit data cannot be subjected to transparent computing with background colors. Therefore, transparent graphic entities need to be assembled in a manner of 8-bit data output at first, then an 8-bit data dot matrix of the whole layout is screened according to one image-type graphic entity to obtain 1-bit data, and the 1-bit data is drawn to an ultimately-output 1-bit page dot matrix. Therefore, the rasterization speed of the RIP is relatively low.

An early RIP rasterization method comprises determining, by scanning a page, whether transparent graphic entities are contained in the page. If the page contains transparent graphic entities, it is determined to be a transparent page. Each pixel in the transparent page is subjected to transparent mixing operation with the background according to the transparent model, obtaining an ultimate 8-bit page dot matrix. Since not all areas in the transparent page contain transparent graphic entities, such a method may need to handle a large amount of data, resulting in a low rasterization speed.

To improve the rasterization speed of a RIP, in a conventional method, a transparent page is divided into a transparent area containing transparent graphic entities and a nontransparent area not containing transparent graphic entities. The transparent area is assembled according to the transparent model and the nontransparent area is assembled according to the substitute model. The data amount of transparent processing is reduced as compared to the situation in which the entire page is assembled according to the transparent model. However, in the conventional method, assembling the transparent graphic entities of the transparent area is based upon pixels under the equipment coordinate space, and the transparent graphic entities are subjected to transparent computing with background during the assembling. Therefore, when the transparent computing is performed, graphic entity data and background data may already have the equipment resolution. The equipment resolution may be as high as 2,400 dpi, or even higher, thus the data amount of transparent computing may be large. In addition, formula for the transparent computing may also be complex. As a result, the transparent computing may still be time consuming.

SUMMARY

In accordance with the present disclosure, there is provided a method for rasterizing a transparent page. The method comprises interpreting the transparent page to obtain graphic entities, transparency properties of the graphic entities, and profile information of the graphic entities; dividing the transparent page into a transparent area and a nontransparent area according to the transparency properties of the graphic entities; identifying, from the graphic entities, an overlapping graphic entity having an overlapping portion with the transparent area according to the profile information of the graphic entities; and dividing the transparent area into a de-transparentizing area and an ultimate transparent area by using the overlapping graphic entity.

Also in accordance with the present disclosure, there is provided a device for rasterizing a transparent page. The device comprises a page description language interpreting unit and a de-transparentizing unit. The page description language interpreting unit is configured to interpret the transparent page to obtain graphic entities, transparency properties of the graphic entities, and profile information of the graphic entities; and divide the transparent page into a transparent area and a nontransparent area according to the transparency properties of the graphic entities. The de-transparentizing unit is configured to identify, from the graphic entities, an overlapping graphic entity having an overlapping portion with the transparent area according to the profile information of the graphic entities; and divide the transparent area into a de-transparentizing area and an ultimate transparent area by using the graphic entities respectively having an overlapping portion with the transparent area.

Features and advantages consistent with the disclosure will be set forth in part in the description which follows, and in part will be obvious from the description, or may be learned by practice of the disclosure. Such features and advantages will be realized and attained by means of the elements and combinations particularly pointed out in the appended claims.

It is to be understood that both the foregoing general description and the following detailed description are exemplary and explanatory only and are not restrictive of the invention, as claimed.

DESCRIPTION OF THE EMBODIMENTS

Hereinafter, embodiments consistent with the disclosure will be described with reference to drawings. Wherever possible, the same reference numbers will be used throughout the drawings to refer to the same or like parts.

Figure 1:
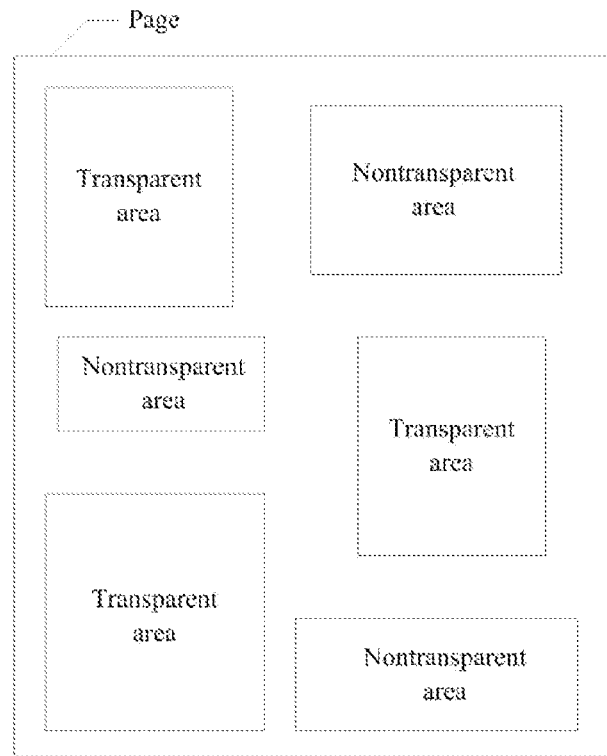
FIG. 1 is distribution diagram of the transparent area and the nontransparent area in the transparent page provided in an embodiment of the present disclosure.

Consistent with embodiments of the present disclosure, a transparent page refers to a page containing transparent graphic entities, where the transparent graphic entities are graphic entities with transparency property. In the transparent page, areas not containing transparent graphic entities are nontransparent areas and areas containing transparent graphic entities are transparent areas. Not all the areas in the transparent page are transparent areas. FIG. 1 schematically shows a distribution of transparent areas and nontransparent areas in a transparent page. Graphic entities in the transparent areas are assembled according to a transparent model, and graphic entities in the nontransparent areas are assembled according to a substitute model.

Graphic entities forming the transparent areas may be of different types, such as graph-type graphic entities, image-type graphic entities, and shading-type graphic entities. For example, some page contents may comprise only one or more graph-type graphic entities, some page contents may comprise only one image-type graphic entity or one shading-type graphic entity, and some page contents may comprise a mixture of different types of graphic entities. The page contents comprising only graph-type graphic entities, or the page contents comprising only one image-type graphic entity or one shading-type graphic entity, may have relatively less information, and can be subjected to de-transparentizing, i.e. transparent computing, before the assembling, to reduce the number of transparent areas, so as to reduce the data amount of the transparent computing and improve the rasterization speed of the RIP.

Consistent with the present disclosure, a transparent page is first divided into transparent areas and nontransparent areas, and the transparent areas are divided into de-transparentizing areas and ultimate transparent areas. Before assembling the page contents, graphic entities in the de-transparentizing areas are subjected to de-transparentizing, i.e. transparent computing, so as to eliminate the transparency property of those transparent graphic entities. The graphic entities in the nontransparent areas and the de-transparentizing areas are assembled according to the substitute model, while the graphic entities in the ultimate transparent areas are assembled according to the transparent model. The assembled data in these three areas are combined and output to equipment. As a result, the rasterization speed of the RIP may be improved.

Figure 2:
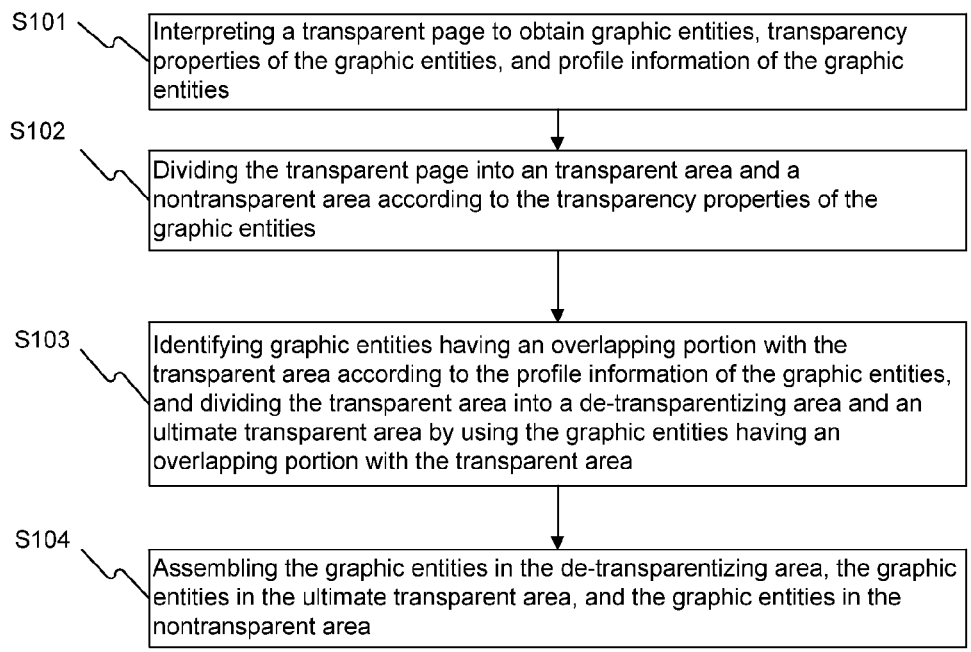
FIG. 2 is an integrated flowchart of a method for rasterizing transparent page provided in an embodiment of the present disclosure.

FIG. 2 schematically shows a method for rasterizing a transparent page consistent with embodiments of the present disclosure. As shown in FIG. 2, at S101, a transparent page is interpreted to obtain graphic entities, transparency properties of the graphic entities, and profile information of the graphic entities. At S102, the transparent page is divided into a transparent area and a nontransparent area according to the transparency properties of the graphic entities. At S103, graphic entities having an overlapping portion with the transparent area are identified according to the profile information of the graphic entities, and the transparent area is divided into a de-transparentizing area and an ultimate transparent area by using the graphic entities having an overlapped portion with the transparent area. At S104, the graphic entities in the de-transparentizing area, the graphic entities in the ultimate transparent area, and the graphic entities in the nontransparent area are assembled.

Figure 3:
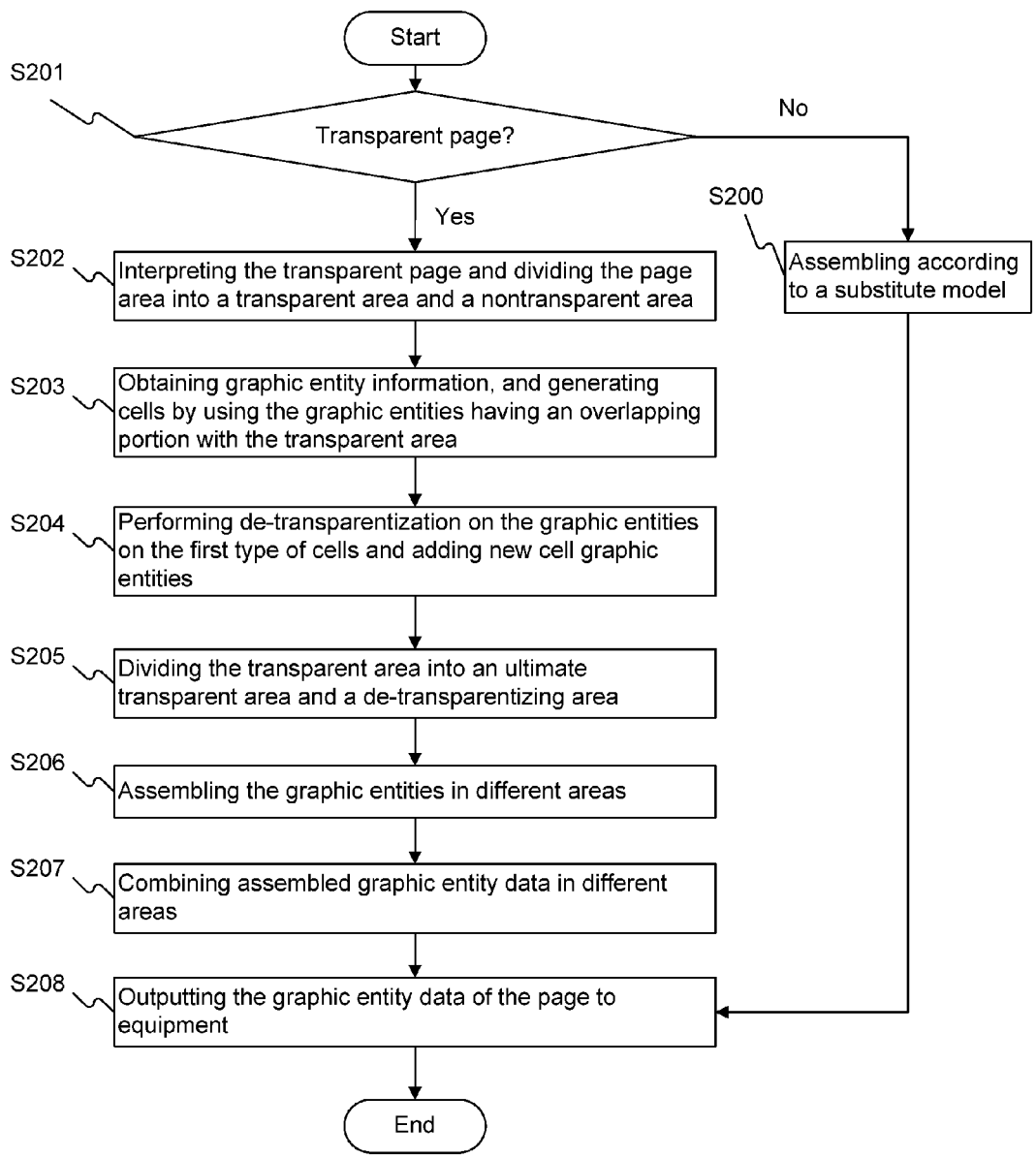
FIG. 3 is a flowchart of a method for rasterizing transparent page provided in an embodiment of the present disclosure.

FIG. 3 shows the details of the method for rasterizing transparent page consistent with embodiments of the present disclosure. At S201, page contents of a page are scanned to determine whether the page is a transparent page. The page may be determined to be a nontransparent page if the page does not contain a transparent graphic entity. In this situation, S200 is executed. The page may be determined to be a transparent page if the page contains transparent graphic entities. In this situation, S202 is executed.

At S200, the page contents are assembled according to the substitute model. After that, the process continues at S208.

At S202, the transparent page is interpreted and divided into a transparent area and a nontransparent area.

Specifically, the graphic entities in the transparent page are interpreted and graphic entity information in the transparent page is recorded in an intermediate file (intermediate instruction file). The graphic entity information may include a type of a graphic entity, a transparency property of a graphic entity, a location of a graphic entity, a profile of a graphic entity, and a color value of a graphic entity, etc. The type of a graphic entity may include graph-type, shading-type, image-type, and etc. The transparency property is used for indicating whether the graphic entity is a transparent graphic entity or a nontransparent graphic entity.

The transparent page is divided into a transparent area and a nontransparent area according to the transparent properties of the graphic entities in the page recorded in the intermediate file. That is, areas in the page covered by the transparent graphic entities are counted in transparent area distribution information, and areas in the page covered by the nontransparent graphic entities are counted in nontransparent area distribution information. In some embodiments, an area covered by a bounding rectangle of the graphic entity may be treated as the area covered by the graphic entity. The transparent area distribution information and the nontransparent area distribution information are managed by a page resource distribution management unit. The page resource distribution management unit is further used for managing de-transparentizing area distribution information and ultimate transparent area distribution information to be written in the file as described below.

At S203, the intermediate file is scanned to obtain the graphic entity information, thereby identifying graphic entities having an overlapping portion with the transparent area according to the profile information of the graphic entities. A graphic entity having an overlapping portion with the transparent area may be referred to as an overlapping graphic entity. In addition, cells of the transparent area are generated using the graphic entities having an overlapping portion with the transparent area.

Consistent with the present disclosure, a cell is an area in the transparent area in which the graphic entity properties are the same. When the graphic entities have an overlapping portion with the transparent area and the properties of the graphic entities in the overlapped portion are the same, the overlapping portion is taken as a cell. That is, the page contents of the transparent area are divided into a plurality of cells, which may be of different sizes. Pixels in a cell have same graphic entity properties, that is, the pixels in a cell have same graphic entity sets. The final color value of one pixel may be a superposition result of multiple graphic entities.

Consistent with embodiments of the present disclosure, there may be three types of cells. A first type of cell may only contain one graph-type graphic entity or more than one graph-type graphic entities. A second type of cell may only contain one non-graph-type graphic entity, such as, for example, one image-type graphic entity or one shading-type graphic entity. A third type of cell may contain at least two types of graphic entities or contain more than one non-graph-type graphic entity. For example, a third type of cell may contain any two or three types of graphic entities, or contain more than one image-type graphic entity or more than one shading-type graphic entity.

At S204, de-transparentization is performed on the graphic entities on the first type of cells of the transparent area and the graphic entities subjected to de-transparentization are taken as cell graphic entities, which is, namely, the process of generating cell graphic entities, and then the cell graphic entities are added to the intermediate file as new graphic entities.

The de-transparentization includes transparent computing on sampling pixels, which are characteristic pixels based on the cell graphic entities.

The graphic entity properties of every pixel on the first type of cell are consistent, namely, the graphic entity sets on every pixel are the same, so transparent computing on the graphic entities on the first type of cell are based upon a certain characteristic pixel of the graphic entities on the entire cell, not upon every pixel on the cell. That is to say, for the first type of cell, only a certain characteristic pixel on the cell needs to be extracted for computing, and the color value of the characteristic pixel after computing is the color value of the entire cell without computing the pixels in the cell one by one, thus substantially reducing the computing amount of transparent computing and improving the assembly speed of RIP. In other words, the rasterization speed of RIP is improved. The color value of the graphic entities of the first type of cell after de-transparentization is taken as the color value of the graphic entities finally drawn to the page.

The cell graphic entities resulted from transparent computing are added to the intermediate file as new graphic entities, and correspondingly, the other graphic entities in the intermediate file are non-cell graphic entities.

At S205, the transparent area is divided into a de-transparentizing area and an ultimate transparent area according to the type of the cells generated in step S203. At this time, the whole page is divided into the ultimate transparent area, the de-transparentizing area, and the nontransparent area.

Specifically, areas covered by the first type of cells and the second type of cells belong to the de-transparentizing area, an area covered by the third type of cells belongs to the ultimate transparent area, and areas in the page other than the de-transparentizing area and the ultimate transparent area are nontransparent areas.

At S206, the graphic entities in the ultimate transparent area, the de-transparentizing area, and the nontransparent area are respectively assembled.

Specifically, the graphic entities in the ultimate transparent area are assembled according to the transparent model, the graphic entities in the de-transparentizing area are assembled according to the substitute model, and the graphic entities in the nontransparent area are assembled according to the substitute model.

Specifically, assembling the graphic entities in the de-transparentizing area includes: if a graphic entity in the de-transparentizing area is a non-cell graphic entity and is an image-type graphic entity or a shading-type graphic entity, performing transparent computing on the sampling pixels of the graphic entity under the original coordinate space of the graphic entity, and assembling the graphic entity subjected to transparent computing according to the substitute model.

Assembling the graphic entities subjected to transparent computing according to the substitute model further comprises the following steps: if output data is in 1-bit format, the graphic entities subjected to transparent computing are zoomed from the original coordinate space to an equipment coordinate space and then screened, and the screened graphic entities are assembled according to the substitute model; if output data is in 8-bit format, the graphic entities subjected to transparent computing are zoomed from the original coordinate space to the equipment coordinate space, and the zoomed graphic entities are assembled according to the substitute model.

If the graphic entities in the de-transparentizing area are cell graphic entities, the cell graphic entities are directly assembled according to the substitute model; this assembling may comprise the following steps: when outputting 1-bit data, the graphic entities are screened and then assembled according to the substitute model; when outputting 8-bit data, the graphic entities are directly assembled according to the substitute model.

Wherein, the non-cell graphic entities are graphic entities obtained by interpreting the transparent page, and the cell graphic entities are new graphic entities generated after transparent computing; non-cell graph-type graphic entities are skipped without any processing; and non-cell non-transparent graphic entities are skipped as well.

The cell graphic entities are graphic entities obtained after transparent computing, so the color value of the cell graphic entities has been determined and the cell graphic entities are assembled according to the substitute model; for a non-cell graphic entity, each of which is an image-type graphic entity or a shading-type graphic entity, transparent computing is performed under the original space of the graphic entity that has a resolution much lower than that of the equipment coordinate space, so the transparent computing amount can be substantially reduced and the rasterization speed for a transparent page can be improved.

If the output is 1-bit data, the graphic entities in the ultimate transparent area, the de-transparentizing area, and the nontransparent area are assembled in different assembling spaces, respectively; the graphic entities in the de-transparentizing area and the nontransparent area are assembled in an ultimately-output 1-bit page dot matrix space, and the graphic entities in the ultimate transparent area are assembled in an 8-bit dot matrix space other than the 1-bit page dot matrix space.

If the output is 8-bit data, the graphic entities in the ultimate transparent area, the de-transparentizing area and the nontransparent area are assembled in the same assembling space, that is, assembled in an ultimately-output 8-bit dot matrix space.

At S207, the data assembled to the ultimate transparent area, the de-transparentizing area, and the nontransparent area is combined.

If the output is 8-bit data, the assembling spaces of all the areas in the page are ultimately-output 8-bit dot matrix spaces, so the combination for area data is not needed.

If the output is 1-bit data, the assembling space of the graphic entities in the ultimate transparent area is beyond the ultimately-output 1-bit page dot matrix space and the assembling spaces of the graphic entities in the de-transparentizing area and the nontransparent area are within the ultimately-output 1-bit page dot matrix space, so the assembling space in the ultimate transparent area is separated from the assembling spaces in the de-transparentizing area and the nontransparent area. That will result in the separation of the area data after assembling. However, the assembled area data in the ultimate transparent area, the de-transparentizing area, and the nontransparent area can be combined.

Specifically, if the output is 1-bit data, the assembling space of the graphic entities in the ultimate transparent area is the 8-bit dot matrix space, data assembled to the ultimate transparent area is screened as an image. The screened data uses initial tailoring of the transparent area as current tailoring and is assembled to the ultimately-output 1-bit page dot matrix space according to the substitute model.

At S208, all the data assembled to the page is output to the equipment.

Figure 4:
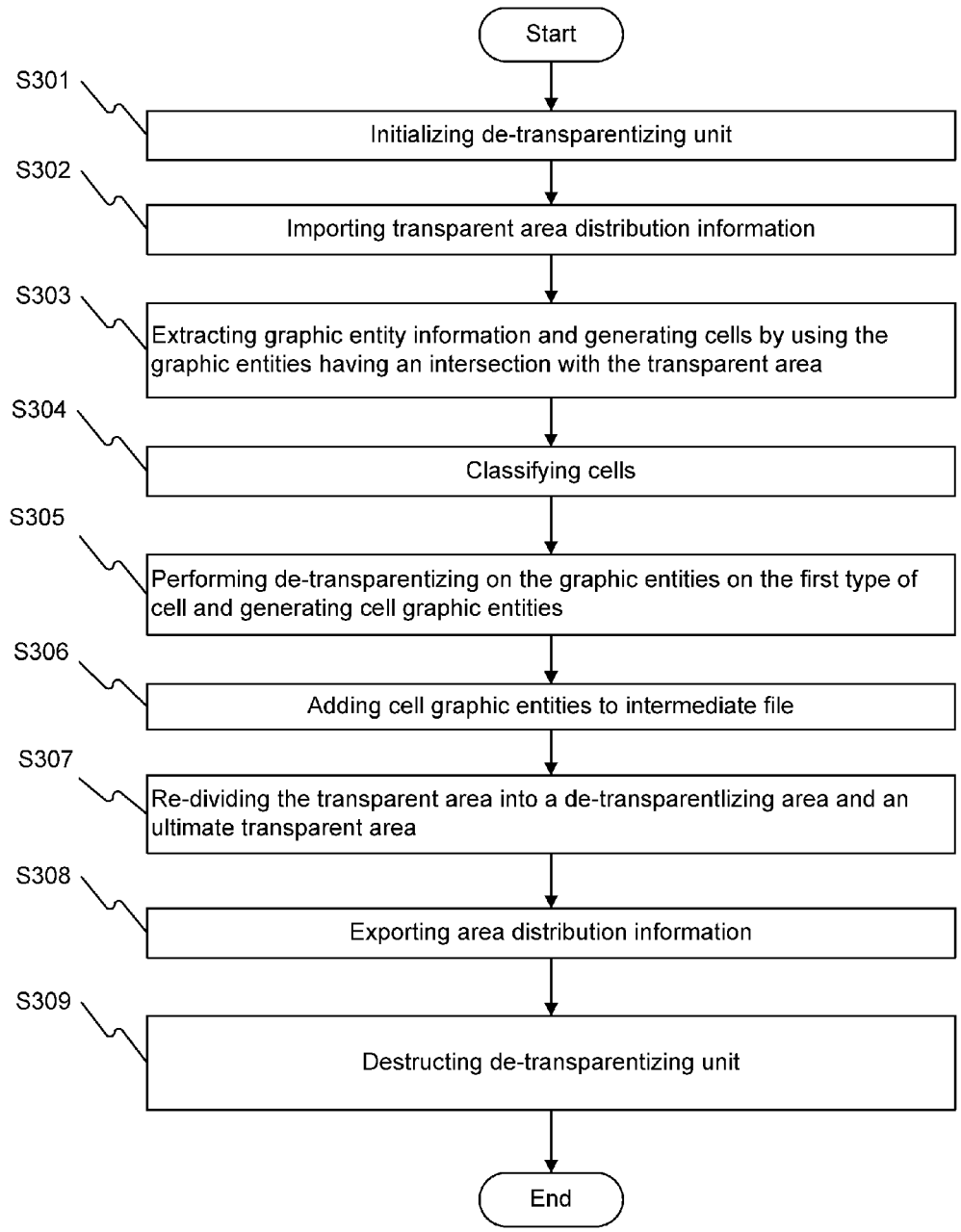
FIG. 4 is a flowchart of de-transparentization processing for transparent graphic entities provided in an embodiment of the present disclosure.

Referring to FIG. 4, performing de-transparentization on part of the transparent graphic entities of the transparent area and dividing the transparent area into a de-transparentizing area and an ultimate transparent area are all completed by a de-transparentizing unit. This step may include the following steps.

At S301, the de-transparentizing unit is initialized. At this time, the number of cells is zero.

At S302, transparent area distribution information is imported.

The step may comprise acquiring transparent area distribution information, in the page resource management unit, as the transparent area distribution information in the de-transparentizing unit.

At S303, the intermediate file is scanned to extract graphic entity information, including profile information of the graphic entities. Graphic entities that have an overlapping portion with the transparent area are identified according to the profile information. Cells are generated by using the graphic entities having an overlapping portion with the transparent area in the de-transparentizing unit. The so called overlapping portion in area means that there is an intersection in area, and the intersection mentioned below means that there is an overlapping portion in area.

Specifically, in the step of scanning the intermediate file to sequentially extract graphic entity information, the following process is performed if the profile information of the extracted graphic entities has an intersection with the transparent area in the de-transparentizing unit.

If the extracted graphic entity is a nontransparent graphic entity, the intersection of a previous cell with the graphic entity is deleted from the previous cell (the cell deleting operation is not performed if there is no previous cell), the graphic entity is generated as a new cell, and the intersection of the graphic entity with the ultimate transparent area needs to be deleted from the ultimate transparent area.

If the extracted graphic entity is a transparent graphic entity, the intersection of a previous cell with the extracted graphic entity is deleted from the previous cell, and the intersection is generated as a new cell. The graphic entity information on this cell is the sum of the graphic entity information on the original cell and the information of this extracted graphic entity. The intersection of the extracted graphic entity with the ultimate transparent area does not generate a cell. The remaining part of the extracted graphic entity is generated as a new cell, and the graphic entity information on this cell is the graphic entity information of the extracted graphic entity.

At S304, all of the generated cells are scanned and the cells are classified according to the graphic entity information on the cells.

Specifically, if a cell contains transparent graphic entities and only contains graph-type graphic entities, the cell is of the first type; if a cell contains transparent graphic entities and only contains one image-type graphic entity or one shading-type graphic entity, the cell is of the second type; and if a cell contains transparent graphic entities and contains at least two types of graphic entities or contains at least two shading-type graphic entities or two image-type graphic entities, the cell is of the third type.

At S305, de-transparentization is performed on the graphic entities on the first type of cell, namely, transparent computing is performed on the characteristic pixels of the graphic entities on the cell to eliminate the transparency properties.

The first type of cell is a cell only containing graphs. All the pixels on the cell has the same properties, that is, graphic entity sets on every pixel are the same. A characteristic pixel is extracted and the transparent computing is performed on the characteristic pixel. The result of this transparent computing on the characteristic pixel is taken as the final color value of the cell graphic entities. That is, the graphic entity sets on the cell are subjected to transparent computing to generate a cell graphic entity, and this graphic entity is substantially a graph-type graphic entity obtained by transparent flattening. In this manner, if a cell comprises N pixels, the number of times that transparent computing needs to be performed is reduced by N−1 times. This may be a large number in a practical application, as high as 1M or even higher. The computing amount of transparent computing is reduced as compared to the conventional method where transparent computing is performed for all pixels one by one during assembling. This is because the transparent computing for graphic entities during assembling in the conventional method is based upon the equipment resolution. Thus, not only large computing amount of transparent computing is required, but also the computing formula for the transparent computing is complex, resulting in large time cost in computing. On the other hand, according to the present disclosure, transparent computing before assembling is based upon cells, only one transparent computing is performed on one cell. Therefore, the rasterization speed of RIP for a transparent page is improved.

At S306, the cell graphic entity, as a new graphic entity, is added to the intermediate file in which other graphic entities are non-cell graphic entities.

At S307, the transparent area is re-divided. Areas covered by the first type of cell and the second type of cell are classified into the de-transparentizing area of the de-transparentizing unit; and an area covered by the third type of cell is classified into the ultimate transparent area of the de-transparentizing unit.

In some embodiments, de-transparentizing may be performed on the graphic entities on the second type of cell during de-transparentizing on the graphic entities on the first type of cell, to reduce the computing amount of transparent computing. In alternative embodiments, de-transparentizing is not performed on the graphic entities on the second type of cell until before the subsequent assembling, when the de-transparentizing is performed under the original coordinate space of the graphic entities. The reason for this is that the data amount of one image-type graphic entity or one shading-type graphic entity is larger than that of a graph-type graphic entity. If image-type graphic entities or shading-type graphic entities on the second type of cell are subjected to transparent computing at first, the data after computing needs to be buffered and then read at the stage of assembling, which increases the required memory space and adds a reading procedure. Therefore, in the alternative embodiments, de-transparentizing is not performed on the second type of cell when writing the intermediate file. Transparent computing is performed on image-type graphic entities or shading-type graphic entities under the original coordinate spaces thereof. Since the resolution of the original coordinate space is lower than that of the equipment coordinate space, the computing amount of transparent computing on pixels under the original coordinate space is reduced as compared to the computing amount of transparent computing on image-type graphic entities or shading-type graphic entities under the equipment coordinate space. Accordingly, the rasterization speed of RIP is improved. For example, the original space of image-type or shading-type graphic entities is typically a low-resolution space, e.g., ranging from 72 dpi to 300 dpi. On the other hand, the equipment resolution may be as high as 2,400 dpi or even higher. The small data amount of transparent computing under the low-resolution space results in high rasterization speed of RIP.

It is noted that S305 and S306 are interchangeable in sequence, or they can be performed simultaneously.

At S308, area distribution information is exported. Specifically, the ultimate transparent area distribution information in the de-transparentizing unit is written into the ultimate transparent area distribution information in the page resource management unit, and the de-transparentizing area distribution information in the de-transparentizing unit is written into the de-transparentizing area distribution information in the page resource management unit. At this moment, the page resource management unit comprises the ultimate transparent area distribution information, the de-transparentizing area distribution information, and the nontransparent area distribution information.

At S309, the de-transparentizing unit is destructed, namely all the information in the de-transparentizing unit is cleared.

After the above de-transparentizing is performed, graphic entities of different areas in the transparent page are assembled in different assembling spaces.

Figure 5:
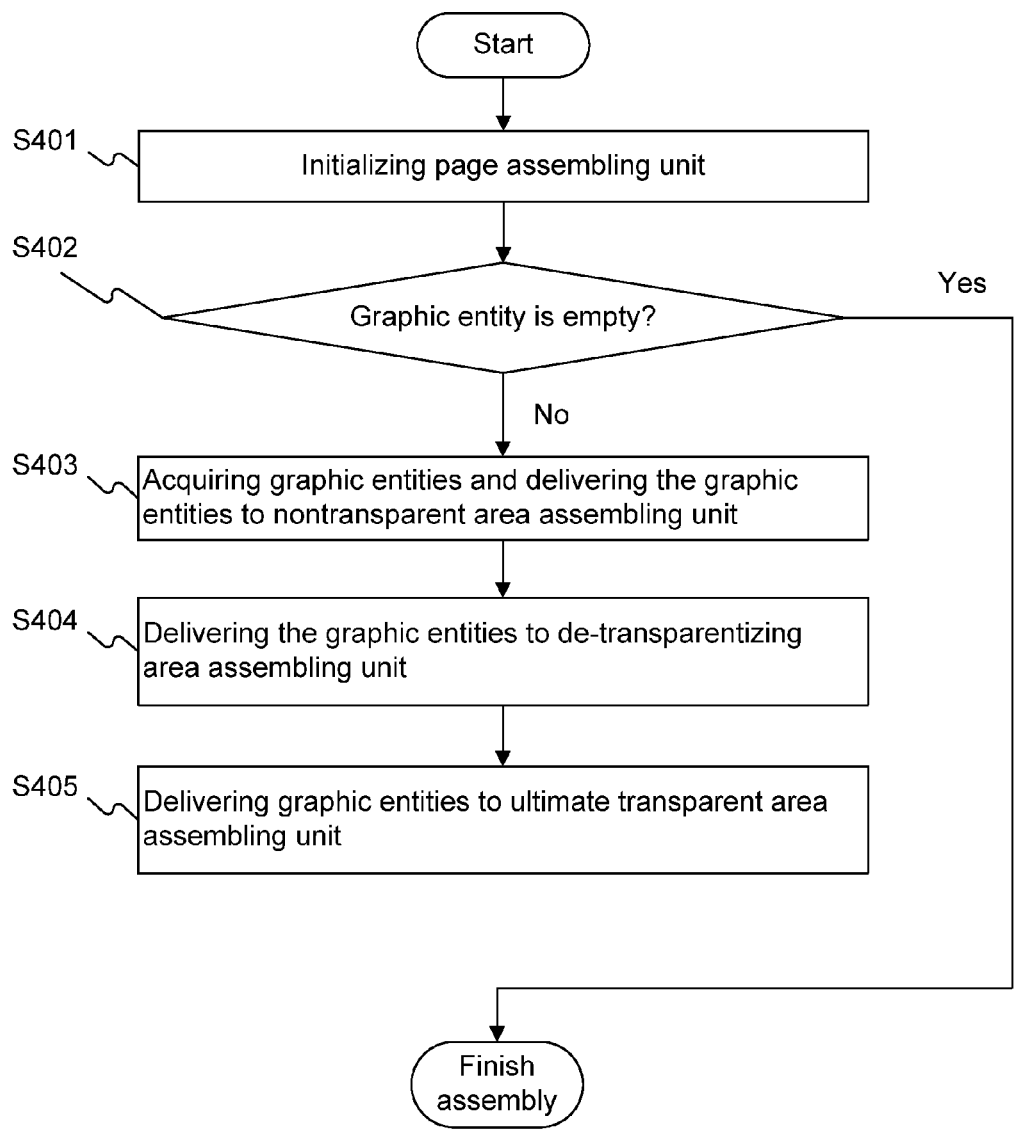
FIG. 5 is a flowchart of assembling content of a transparent page provided in an embodiment of the present disclosure.

FIG. 5 shows a process of assembling the page dot matrixes of the ultimate transparent area, the de-transparentizing area, and the nontransparent area in the page resource management unit by a page assembling unit.

As shown in FIG. 5, at S401, the page assembling unit is initialized, which may comprise initializing a nontransparent area assembling unit, a de-transparentizing area assembling unit, and an ultimate transparent area assembling unit.

When initializing the nontransparent area assembling unit, the ultimate nontransparent area is taken as an initial tailoring of the nontransparent area assembling unit, and the ultimately-output page dot matrix space is taken as the dot matrix assembling space for the nontransparent area regardless of 1-bit data output or 8-bit data output.

When initializing the de-transparentizing area assembling unit, the de-transparentizing area is taken as an initial tailoring of the de-transparentizing are assembling unit, and the ultimately-output dot matrix space is taken as the dot matrix assembling space for the de-transparentizing area regardless of 1-bit data output or 8-bit data output.

When initializing the ultimate transparent area assembling unit, the ultimate transparent area is taken as an initial tailoring of the assembling unit. If the output is 8-bit data, the ultimately-output 8-bit page dot matrix space is taken as the dot matrix assembling space for the transparent area. If the output is 1-bit data, one 8-bit dot matrix space is additionally created and taken as the dot matrix assembling space for the ultimate transparent area.

In some embodiments, the above initialization processes for the area assembling units may be executed concurrently.

At S402, the intermediate file is scanned to determine whether the graphic entity is empty. If the graphic entity is empty, the assembling process is ended. Otherwise, graphic entities are acquired sequentially and the process proceed to S403.

In some embodiments, acquiring graphic entities sequentially is based on a sequence of the graphic entities in the intermediate file, and only one graphic entity may be acquired each time.

At S403, the graphic entities acquired above are delivered to the nontransparent area assembling unit for assembly.

The nontransparent area assembling unit determines whether an intersection between the profile of an acquired graphic entity and the initial tailoring and current tailoring of the assembling unit is empty, according to the profile of the acquired graphic entity.

If the intersection is not empty and the acquired graphic entity is a nontransparent graphic entity, the nontransparent area assembling unit assembles the acquired graphic entity according to the substitute model.

If the intersection is not empty and the acquired graphic entity is a transparent graphic entity, or if the intersection is empty, the nontransparent area assembling unit does not perform assembly processing on the acquired graphic entity.

After the above processing by the nontransparent area assembling unit is finished, the acquired graphic entity is delivered to the next assembling unit, such as the de-transparentizing area assembling unit.

At S404, the graphic entities acquired above are delivered to the de-transparentizing area assembling unit for assembly.

The de-transparentizing area assembling unit determines whether an intersection between the profile of an acquired graphic entity and the initial tailoring and current tailoring of the assembling unit is empty, according to the profile of the acquired graphic entity.

If the intersection is not empty and the acquired graphic entity is a cell graphic entity, the color value of the acquired graphic entity is determined and the acquired graphic entity is assembled according to the substitute model.

If the intersection is not empty and the acquired graphic entity is a non-cell transparent image-type or shading-type graphic entity, data of the acquired graphic entity is read and transparent computing is performed under the original coordinate space of the acquired graphic entity to acquire the graphic entity data of the graphic entity after being de-transparentized to perform assembly. For example, the original coordinate space of an image-type or a shading-type graphic entity is typically a low-resolution space, e.g., ranging from 72 dpi to 300 dpi, while the resolution of the equipment coordinate space may be as high as 2,400 dpi or even higher. Therefore, performing transparent computing on pixel data under the original coordinate space may reduce the amount of computing, and improve the rasterization speed of RIP.

If the acquired graphic entity is a non-cell transparent graphic entity and is neither an image-type or shading-type graphic entity, the de-transparentizing area assembling unit does not perform assembly processing on the acquired graphic entity. This can avoid unnecessary drawing and improve the rasterization speed of RIP for a transparent page.

After the above processing by the de-transparentizing area assembling unit is finished, the acquired graphic entity is delivered to the next assembling unit, such as the ultimate transparent area assembling unit.

At S405, the graphic entities acquired above are delivered to the ultimate transparent area assembling unit for assembly.

The specific assembly processes at S403, S404, and S405 have been explained above with respect to S206, and therefore the description thereof is not repeated.

It is be noted that S403, S404, and S405 are interchangeable in sequence, that is, for example, the acquired graphic entities can be delivered to the ultimate transparent area assembling unit for assembly first, then delivered to the non-transparent area assembling unit for assembly, and finally delivered to the de-transparentizing area assembling unit for assembly. In addition, an acquired graphic entity may have non-empty intersections with more than one of the three area assembling units. Therefore, the acquired graphic entities need to be delivered to the three assembling units for assembly, and the sequence of delivering the graphic entities to the three assembling units is not limited.

In some embodiments, before the assembly of the graphic entities in the entire transparent page, transparent computing may be performed on sample pixels of some of the graphic entities in the preliminarily-divided transparent area. The sample pixels are characteristic pixels based on cell graphic entities or pixels based on image-type graphic entities or shading-type graphic entities under the original coordinate space. After transparent computing is performed on the sample pixels, the obtained graphic entities are assembled in the ultimately-output dot matrix space according to the substitute model, thus reducing the computing amount of transparent computing and improving the rasterization speed of RIP.

Figure 6:
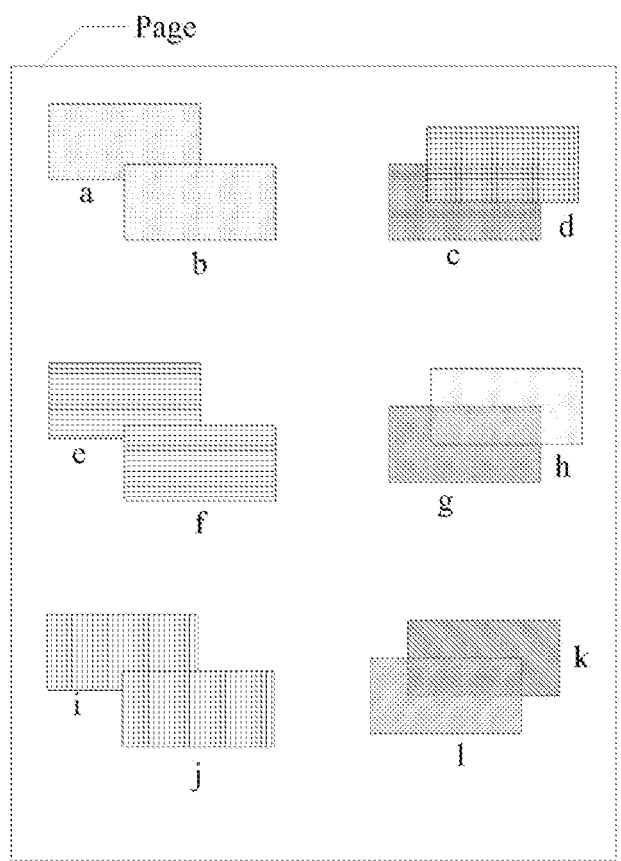
FIG. 6 is a profile diagram of graphic entities in a transparent page provided in an embodiment of the present disclosure.
Figure 7:
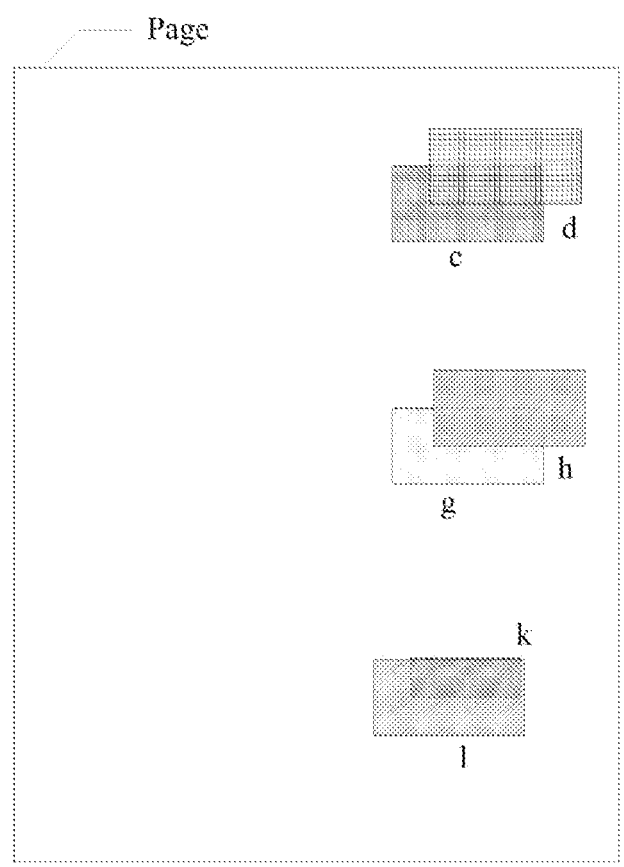
FIG. 7 is a distribution diagram of a transparent area in a transparent page provided in a embodiment of the present disclosure.
Figure 8:
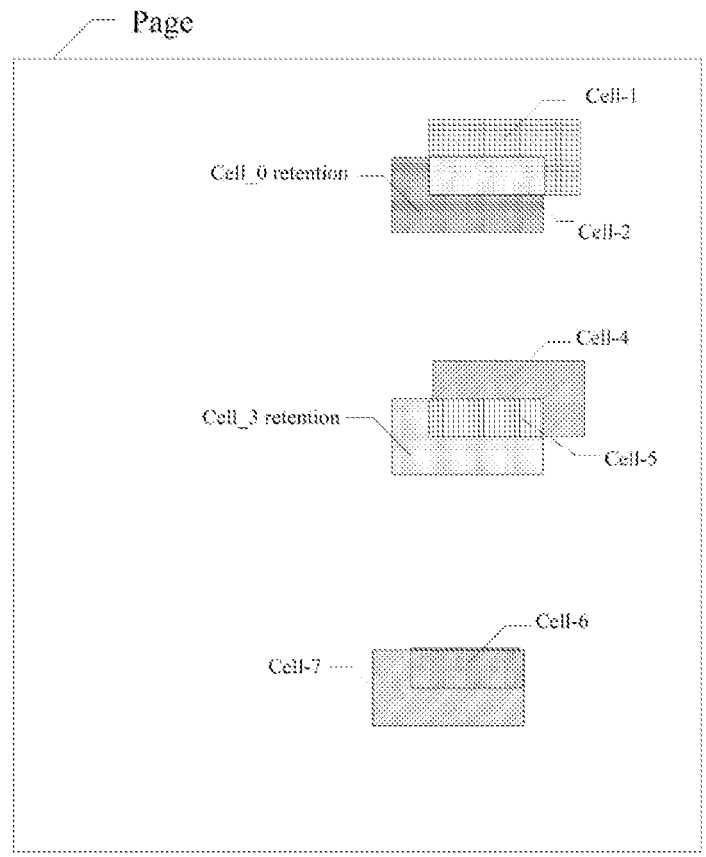
FIG. 8 is a distribution diagram of cells generated by a de-transparentizing unit provided in an embodiment of the present disclosure.

FIGS. 6-8 schematically illustrate an exemplary process consistent with embodiments of the present disclosure.

As shown in FIG. 6, a transparent page comprises graphic entity a, graphic entity b, graphic entity c, graphic entity d, graphic entity e, graphic entity f, graphic entity g, graphic entity h, graphic entity i, graphic entity j, graphic entity k, and graphic entity I. Graphic entities a and b are nontransparent graph-type graphic entities, graphic entities c and d are transparent graph-type graphic entities, graphic entities e and f are nontransparent shading-type graphic entities, graphic entities g and h are transparent shading-type graphic entities, graphic entities i and j are nontransparent image-type graphic entities, graphic entity k is a nontransparent graph-type graphic entity, graphic entity I is a transparent image-type graphic entity. FIG. 6 schematically shows profiles of the graphic entities.

Rasterization for the graphic entities in the page is performed as described below.

All the graphic entities in the page are scanned. Graphic entity a, graphic entity b, graphic entity c, graphic entity d, graphic entity e, graphic entity f, graphic entity g, graphic entity h, graphic entity i, graphic entity j, graphic entity k, and graphic entity I in the page are interpreted. The graphic entity information of the graphic entities is written into an intermediate file.

Particularly, graphic entity a is interpreted and the interpreted transparency property, graphic entity type, color value, and profile information of graphic entity a are written into the intermediate file.

Graphic entity b is interpreted and the interpreted transparency property, graphic entity type, color value, and profile information of graphic entity b are written into the intermediate file.

Graphic entity c is interpreted and the interpreted transparency property, graphic entity type, color value, and profile information of graphic entity c are written into the intermediate file, and the profile information of graphic entity c is counted in the transparent area.

Graphic entities d, e, f, g, h, i, j, k, and I are processed. Graphic entities e, f, i, j, and k are processed in a same manner as graphic entity a, and graphic entities d, g, h, and I are processed in a same manner as graphic entity c.

After the above processing, the graphic entity information of, e.g., data of the graphic entities, transparency properties of the graphic entities, types of the graphic entities, color values of the graphic entities, and profiles of the graphic entities, has been written into the intermediate file, and the profile information of transparent graphic entities has been counted in the transparent area. Page area other than the transparent area is the nontransparent area. The transparent area page distribution information and the nontransparent area page distribution information are managed by a page resource management unit. In this case, the transparent area in the page resource management unit is schematically shown in FIG. 7.

Afterwards, de-transparentization is performed on some of the graphic entities of the transparent area in the page resource management unit, and the transparent area is divided into a de-transparentizing area and an ultimate transparent area. The de-transparentizing area distribution information and the ultimate transparent area distribution information are written into the page resource distribution management unit. The de-transparentization on some of the graphic entities of the above transparent area is performed by a de-transparentizing unit, as described below.

The de-transparentizing unit is initialized. At this time, the number of cells is 0.

The graphic entity distribution information of the transparent area in the page resource management unit is imported to the de-transparentizing unit. Specifically, the de-transparentizing unit acquires the transparent area distribution information of the graphic entities in the page resource distribution management unit and takes the transparent area distribution information as the transparent area distribution information in the de-transparentizing unit. The transparent area described below is the transparent area in the de-transparentizing unit.

The intermediate file is scanned to extract graphic entity information of graphic entity a, graphic entity b, graphic entity c, graphic entity d, graphic entity e, graphic entity f, graphic entity g, graphic entity h, graphic entity i, graphic entity j, graphic entity k, and graphic entity l to generate cell graphic entities, as described below.

The profile information of graphic entity a is acquired, and whether there is an intersection between an area covered by graphic entity a and the transparent area is determined. Since graphic entity a does not intersect with the transparent area, no processing is performed on graphic entity a.

The profile information of graphic entity b is acquired, and whether there is an intersection between an area covered by graphic entity b and the transparent area is determined. Since graphic entity b does not intersect with the transparent area, no processing is performed on graphic entity b.

The profile information of graphic entity c is acquired, and whether there is an intersection between an area covered by graphic entity c and the transparent area is determined. Since graphic entity c intersects with the transparent area, and since no previous cells exists and graphic entity c is a transparent graphic entity, a new cell Cell_0 is generated based on graphic entity c. The information on Cell_0 is graphic entity c.

The profile information of graphic entity d is acquired, and whether there is an intersection between an area covered by graphic entity d and the transparent area is determined. Since graphic entity d intersects with the transparent area, and since the number of previous cells is 1 and graphic entity d is a transparent cell intersecting with Cell_0, the intersection of graphic entity d with Cell_0 is deleted and the remaining part is generated as Cell_1. The information on Cell_1 is graphic entity d; The intersection of Cell_0 with graphic entity d is generated as Cell_2. The information on Cell_2 is a graphic entity combination of graphic entities c and d. The remaining part of Cell_0 after the intersection with graphic entity d is deleted is taken as Cell_0 retention. The information on Cell_0 retention is only graphic entity c.

Graphic entities e and f are processed in a same manner as graphic entity a.

The profile information of graphic entity g is acquired, and whether there is an intersection between an area covered by graphic entity g and the transparent area is determined. Since graphic entity g intersects with the transparent area, and since the number of previous cells is 3 and graphic entity g is a transparent graphic entity, graphic entity g is generated as a new cell Cell_3. The information on Cell_3 is graphic entity g.

The profile information of graphic entity h is acquired, and whether there is an intersection between an area covered by graphic entity h and the transparent area is determined. Since graphic entity h intersects with the transparent area, and since the number of previous cells is 4 and graphic entity h is a transparent cell intersecting with Cell_3, the intersection of graphic entity h with Cell_3 is deleted and the remaining part is generated as Cell_4. The information on Cell_4 is graphic entity h. The intersection of Cell_3 with graphic entity g is generated as Cell_5. The information on Cell_5 is a graphic entity combination of Cell_3 and graphic entity h. The remaining part of Cell_3 after the intersection with graphic entity h is deleted is taken as Cell_3 retention. The information on Cell_0 retention is only graphic entity c.

Graphic entities i and j are processed in a same manner as graphic entity a.

The profile information of graphic entity k is acquired, and whether there is an intersection between an area covered by graphic entity k and the transparent area is determined. Since graphic entity k intersects with the transparent area, and since the number of previous cells is 6 and graphic entity k is a nontransparent graphic entity, the intersection between graphic entity k and the transparent area is taken as a cell Cell_6. The information on Cell_6 is graphic entity k.

The profile information of graphic entity l is acquired, and whether there is an intersection between an area covered by graphic entity l and the transparent area is determined. Since graphic entity l intersects with the transparent area and the number of previous cells is 7, the intersection between graphic entity l and Cell_6 is deleted and the remaining part is generated as Cell_7. The profile of Cell_6 keeps unchanged, but the information on Cell_6 becomes a graphic entity combination of graphic entities k and l.

In this case, the generated cells are shown in FIG. 8, including Cell_0 retention, Cell_1, Cell_2, Cell_3 retention, Cell_4, Cell_5, Cell_6, and Cell_7.

The above cells are scanned and classified, as follows.

The cell Cell_0 retention is acquired, on which there is a transparent graphic entity that is only one graph-type graphic entity. Therefore, Cell_0 retention is a first type of cell.

The cell Cell_1 is acquired, on which there is a transparent graphic entity that is only one graph-type graphic entity. Therefore, Cell_1 is a first type of cell.

The cell Cell_2 is acquired, on which there are transparent graphic entities that are two graph-type graphic entities. Therefore, Cell_2 is a first type of cell.

The cell Cell_3 is acquired, on which there is a transparent graphic entity that is one shading-type graphic entity. Therefore, Cell_3 is a second type of cell.

The cell Cell_4 is acquired, on which there is a transparent graphic entity that is one shading-type graphic entity. Therefore, Cell_4 is a second type of cell.

The cell Cell_5 is acquired, on which there are transparent graphic entities that are two shading-type graphic entities. Therefore, Cell_5 is a third type of cell.

The cell Cell_6 is acquired, on which there are transparent graphic entities that are one graph-type graphic entity and one image-type graphic entity. Therefore, Cell_6 is a third type of cell.

The cell Cell_7 is acquired, on which there is a transparent graphic entity that is one image-type graphic entity. Therefore, Cell_7 is a second type of cell.

Perform de-transparentizing on the graphic entities of the first type of cells. Add the graphic entities generated after the de-transparentizing to the intermediate file as cell graphic entities, as described below.

Transparent computing is performed on the graphic entities on Cell_0 retention, obtaining Cell_0 retention graphic entities. Color values after the transparent computing are taken as the final color values of the graphic entities on Cell_0 retention, and the Cell_0 retention graphic entities are written into the intermediate file as new graphic entities.

Transparent computing is performed on the graphic entities on the Cell_1, obtaining Cell_1 graphic entities. Color values after the transparent computing are taken as the final color values of the graphic entities on Cell_1, and the Cell_1 graphic entities are written into the intermediate file as new graphic entities.

Transparent computing is performed on the graphic entities on Cell_2, obtaining Cell_2 graphic entities. Color values after the transparent computing are taken as the final color values of the graphic entities on Cell_2, and Cell_2 graphic entities are written into the intermediate file as new graphic entities.

Graphic entities on other cells may not be subjected to transparent computing, and thus no cell graphic entity is generated from those graphic entities.

The area is divided into the ultimate transparent area and the de-transparentizing area.

Cell_0 retention, Cell_1, and Cell_2 are the first type of cells. Therefore, areas covered by Cell_0 retention, Cell_1, and Cell_2 are included in the de-transparentizing area.

Cell_3 is the second type of cell. Since a large amount of information is contained in the shading-type graphic entities on Cell_3, de-transparentizing computing is not performed on the graphic entities on this cell at this stage to reduce the reading procedure for data in the final assembly process. An area covered by Cell_3 is included in the de-transparentizing area.

Cell_4 is the second type of cell. Since a large amount of information is contained in the shading-type graphic entities on Cell_4, de-transparentizing computing is not performed on the graphic entities on this cell at this stage to reduce the reading procedure for data in the final assembly process. An area covered by Cell_4 is included in the de-transparentizing area.

Cell_5 is the third type of cell. An area covered by the cell is included in the ultimate transparent area.

Cell_6 is the third type of cell. An area covered by the cell is included in the ultimate transparent area.

Cell_7 is the second type of cell. Transparent computing is not performed on the graphic entities on this cell, and an area covered by the cell is included in the de-transparentizing area.

In this case, the graphic entities in the intermediate file include: graphic entity a, graphic entity b, graphic entity c, graphic entity d, graphic entity e, graphic entity f, graphic entity g, graphic entity h, graphic entity i, graphic entity j, graphic entity k, graphic entity I, the Cell_0 retention graphic entity, the Cell_1 graphic entity, and the Cell_2 graphic entity.

In this case, the transparent area in the de-transparentizing unit is divided into the de-transparentizing area and the ultimate transparent area.

The area distribution information is then exported. That is, the de-transparentizing area distribution information and the ultimate transparent area distribution information in the de-transparentizing unit are exported to the page resource distribution management unit and serve as the de-transparentizing area distribution information and the ultimate transparent area distribution information in the page resource distribution management unit, i.e., as the de-transparentizing area and the ultimate transparent area in the page resource distribution management unit. Data information in these areas are data information in the next assembly.

Finally, after the above de-transparentizing process, the page resource management unit includes the de-transparentizing area, the ultimate transparent area, and the nontransparent area. The page contents, i.e., the graphic entities, of the three areas are respectively assembled, as described below.

The page assembling unit is initialized, which may comprise initializing a nontransparent area assembling unit, a de-transparentizing area assembling unit, and an ultimate transparent area assembling unit When initializing the nontransparent area assembling unit, the ultimate nontransparent area is taken as an initial tailoring of the nontransparent area assembling unit. The ultimately-output page dot matrix space is taken as the dot matrix assembling space of the nontransparent area.

When initializing the de-transparentizing area assembling unit, the de-transparentizing area is taken as an initial tailoring of the de-transparentizing assembling unit. The ultimately-output dot matrix space is taken as the dot matrix assembling space of the de-transparentizing area.

When initializing the ultimate transparent area assembling unit, the ultimate transparent area is taken as an initial tailoring of the assembling unit. If data output to the page is 8-bit data, the ultimately-output page dot matrix space is taken as the dot matrix assembling space for the ultimate transparent area. If data output to the page is 1-bit data, one 8-bit dot matrix space is additionally created and taken as the dot matrix assembling space for the transparent area.

The intermediate file is scanned to acquire the graphic entities, which are delivered to the three assembling units for assembly. The sequence of the graphic entities in the intermediate instruction file may be a, b, c, d, e, f, g, h, i, j, k, I, Cell_0 retention, Cell_1, and Cell_2.

When assembling graphic entity a, the information of graphic entity a is acquired. Graphic entity a is a nontransparent graphic entity and has an intersection with the nontransparent area.

If data output to the page is 8-bit data, graphic entity a is directly assembled by the nontransparent area assembling unit according to the substitute model.

If data output to the page is 1-bit data, graphic entity a is first screened as 1-bit data by the nontransparent area assembling unit. The intersection is assembled according to the substitute model based on current tailoring. Graphic entity a is not processed by the de-transparentizing area assembling unit and the ultimate transparent area assembling unit.

Assembly for graphic entity b is the same as that for graphic entity a.

When assembling graphic entity c, the information of graphic entity c is acquired. Graphic entity c is a transparent graphic entity, has an intersection with the de-transparentizing area, and is a graph-type graphic entity. Therefore, graphic entity c is not processed by the de-transparentizing area assembling unit. Thus, unnecessary drawing can be avoided, and the rasterization speed of RIP for a transparent page can be improved.

Assembly for graphic entity d is the same as that for graphic entity c.

Assembly for graphic entities e and f are the same as that graphic entity a.

When graphic entity g is assembled, the information of graphic entity g is acquired. Graphic entity g is a transparent graphic entity and has an intersection with both the de-transparentizing area and the ultimate transparent area. The part of graphic entity g belonging to the de-transparentizing area is subjected to transparent computing under the original space of the graphic entities, and the color value of the graphic entity after computing is taken as the final color value of the position of the graphic entity.

If data output to the page is 8-bit data, graphic entity g is zoomed to the equipment coordinate space by the de-transparentizing area assembling unit, and the zoomed graphic entity is assembled directly according to the substitute model.

If data output to the page is 1-bit data, graphic entity g is zoomed and then screened by the de-transparentizing area assembling unit, and the graphic entity is assembled directly according to the substitute model.

The part of graphic entity g belonging to the ultimate transparent area is assembled according to the transparent model and finally assembled to the ultimately-output dot matrix space according to the substitute model.

Assembly for graphic entity h is the same as that for graphic entity g.

Assembly for graphic entities i and j are the same way as that for graphic entity a.

When graphic entity k is assembled, the information of graphic entity k is acquired. Graphic entity k is a nontransparent graphic entity and has an intersection with both the nontransparent area and the ultimate transparent area. The part of graphic entity k belonging to the nontransparent area is assembled in the same manner as graphic entity a, the part of graphic entity k belonging to the ultimate transparent area is assembled according to the transparent model, as described below.

If data output to the page is 8-bit data, assembly is performed in the ultimately-output dot matrix space.

If data output to the page is 1-bit data, assembly is performed in a 8-bit dot matrix space additionally created.

Assembly for the graphic entity I is assembled the same as that for graphic entity g.

For Cell_0 retention, since this type of graphic entity only belongs to the de-transparentizing area, and the color value thereof is a color value that has been subjected to transparent computing, it may be assembled as follows.

If data output to the page is 8-bit data, the graphic entity is assembled directly by the de-transparentizing area assembling unit under the 8-bit page dot matrix space according to the substitute model.

If data output to the page is 1-bit data, the graphic entity is screened as 1-bit data by the de-transparentizing area assembling unit under the 1-bit page dot matrix space and assembled according to the substitute model.

Cell_1 and Cell_2 are assembled in the same manner as Cell_0 retention.

After the assemblies in the three areas are completed, data on the page is divided into three parts: nontransparent area data, de-transparentizing area data, and ultimate transparent area data. The data of the three areas is combined and output.

Figure 9:
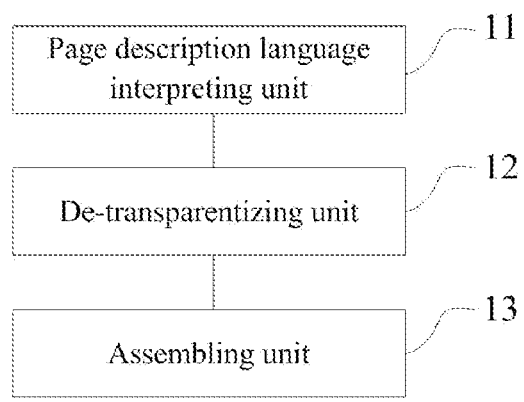
FIG. 9 is a structure diagram of a device for rasterizing transparent page provided in an embodiment of the present disclosure.

FIG. 9 schematically shows an apparatus for rasterizing a transparent page consistent with embodiments of the present disclosure. The apparatus comprises a page description language interpreting unit 11. The page description language interpreting unit ills configured to interpret graphic entities in a transparent page to obtain the graphic entities, transparency properties of the graphic entities, and profile information of the graphic entities; and to divide the transparent page into a transparent area and a nontransparent area according to the transparency properties of the graphic entities.

As shown in FIG. 9, the apparatus also comprises a de-transparentizing unit 12. The de-transparentizing unit 12 is configured to determine graphic entities having an overlapping portion with the transparent area according to the profile information of the graphic entities, and to divide the transparent area into a de-transparentizing area and an ultimate transparent area by using the graphic entities having an overlapping portion with the transparent area.

The apparatus shown in FIG. 9 further comprises an assembling unit 13 configured to assemble the graphic entities in the de-transparentizing area, the graphic entities in the ultimate transparent area, and the graphic entities in the nontransparent area.

Figure 10:
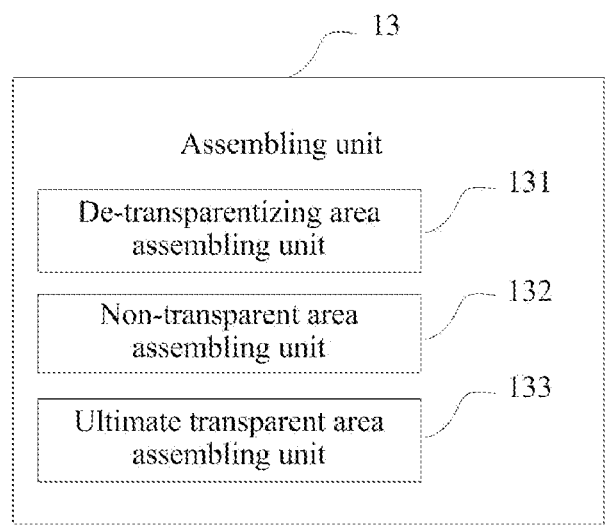
FIG. 10 is a structure diagram of an assembling unit provided in an embodiment of the present disclosure.

FIG. 10 shows an example of the assembling unit 13. As shown in FIG. 10, the assembling unit 13 comprises a de-transparentizing area assembling unit 131 configured to assemble the graphic entities in the de-transparentizing area, a nontransparent area assembling unit 132 configured to assemble the graphic entities in the nontransparent area, and an ultimate transparent area assembling unit 133 configured to assemble the graphic entities in the ultimate transparent area.

The de-transparentizing unit 12 is also configured to generate cells by using the graphic entities having an overlapping portion with the transparent area, and to divide the transparent area into a de-transparentizing area and an ultimate transparent area according to the types of the cells. A cell is an area having the same graphic entity properties in the transparent area. When the graphic entities have an overlapping portion with the transparent area and the properties of the graphic entities on the overlapping portion are the same, the overlapping portion is taken as the a cell.

The de-transparentizing unit 12 is further configured to divide the transparent area into a de-transparentizing area and an ultimate transparent area according to the type of the cell. An area covered by the cell is written into the de-transparentizing area if the cell is a first type of cell. An area covered by the cell is written into the de-transparentizing area if the cell is a second type of cell. An area covered by the cell is written into the ultimate transparent area if the cell is a third type of cell. The first type of cell is a cell only containing image-type graphic entities. The second type of cell is a cell only containing one image-type graphic entity or one shading-type graphic entity. The third type of cell is a cell at least containing two types of graphic entities or at least containing two image-type graphic entities or two shading-type graphic entities.

The de-transparentizing unit 12 is further configured to, if the generated cells are the first type of cells, perform transparent computing on the graphic entities in the cells before an area covered by the first type of cells is written into the de-transparentizing area, so as to obtain cell graphic entities.

The assembling unit 13 is specifically configured to assemble the graphic entities in the de-transparentizing area according to the substitute model, to assemble the graphic entities in the ultimate transparent area according to the transparent model, and to assemble the graphic entities in the nontransparent area according to the substitute model.

Assembling the graphic entities in the de-transparentizing area according to the substitute model by the assembling unit 13 comprises:

If a graphic entity in the de-transparentizing area is one image-type graphic entity or one shading-type graphic entity, performing transparent computing on the graphic entity in the original coordinate space of the graphic entity, and assembling the graphic entity subjected to the transparent computing according to the substitute model.

If the graphic entities in the de-transparentizing area are cell graphic entities, assembling the cell graphic entities according to the substitute model.

Assembling the graphic entities subjected to transparent computing according to the substitute model by the assembling unit 13 further comprises:

If the output is 1-bit data, zooming the graphic entities from the original coordinate space to the equipment coordinate space and screening the zoomed graphic entities, and assembling the screened graphic entities according to the substitute model.

If the output is 8-bit data, zooming the graphic entities from the original coordinate space to the equipment coordinate space, and assembling the zoomed graphic entities according to the substitute model.

The assembling unit 13 is further configured to assemble, if the output is 1-bit data, the graphic entities in the ultimate transparent area, the de-transparentizing area, and the nontransparent area in different dot matrix spaces respectively;

and to assemble, if the output is 8-bit data, the graphic entities in the ultimate transparent area, the de-transparentizing area, and the nontransparent area in the same dot matrix space.

The assembling unit 13 is further configured to assemble, if the output is 1-bit data, the graphic entities in the de-transparentizing area and the nontransparent area in an ultimately-output 1-bit page dot matrix space, and the graphic entities in the ultimate transparent area in an 8-bit dot matrix space; and to assemble, if 8-bit data is output, the graphic entities in the ultimate transparent area, the de-transparentizing area, and the nontransparent area in an ultimately-output 8-bit page dot matrix space.

Figure 11:
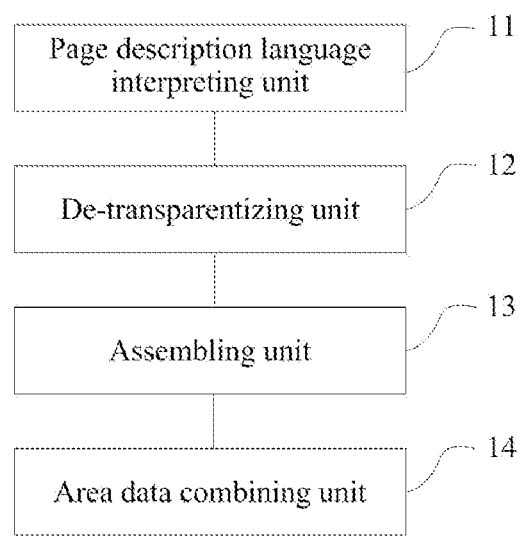
FIG. 11 is a structure diagram of a device for rasterizing transparent page provided in an embodiment of the present disclosure.

FIG. 11 schematically shows another exemplary apparatus for rasterizing a transparent page consistent with embodiments of the present disclosure. As compared to the apparatus shown in FIG. 9, the apparatus shown in FIG. 11 further comprises an area data combining unit 14.

The area data combining unit 14 is configured to, if 1-bit output data is output, combine all the assembled data and output the combined data to equipment after the graphic entities in the ultimate transparent area, the de-transparentizing area, and the nontransparent area are assembled.

Combining all the assembled data and outputting the combined data to equipment by the area data combining unit 14 specifically comprises: screening the graphic entities in the ultimate transparent area as images, assembling the graphic entities to an ultimately-output 1-bit page dot matrix space according to the substitute model, and outputting all the data assembled to the 1-bit page dot matrix space to the equipment.

Consistent with embodiments of the present disclosure, a page is preliminarily divided into a transparent area and a nontransparent area according to the transparency properties of graphic entities after graphic entity information is generated by interpreting the page. Cells are generated from the graphic entities in the transparent area. The graphic entities on the cells are subjected to de-transparentizing according to the types of the cells. The transparent area is divided into a de-transparentizing area and an ultimate transparent area. The graphic entities in the three areas are assembled according to different assembly models, i.e., the graphic entities in the nontransparent area and in the de-transparentizing area are assembled according to the substitute model, and the graphic entities in the ultimate transparent area are assembled according to the transparent model. Transparent computing is performed on sample pixels of the transparent graphic entities before graphic entity assembly, and the process of this transparent computing is based upon pixels of cell graphic entities or upon pixels of image-type or shading-type graphic entities under the original coordinate space thereof, which is different from the transparent computing in the conventional method that is performed under the equipment coordinate space. The resolution of the original coordinate space may be lower than that of the equipment coordinate space. Therefore, the computing amount of transparent computing on the graphic entities under the original coordinate space is reduced and the rasterization speed of RIP for a transparent page is improved.

It shall be understood by those skilled in the prior art that, the embodiments of the present disclosure may be provided as methods, systems or computer program products. Thus, the present disclosure may be in the form of total hardware embodiments, total software embodiments, or software and hardware combined embodiments. Furthermore, the present disclosure may be in the form of computer program products implemented on one or a plurality of computer-readable memory media (including but not limited to disc memory unit and optical memory unit, etc.) containing computer-readable program codes therein.

The present disclosure is described with reference to the flowcharts and/or block diagrams of the methods, equipment (systems) and computer program products in accordance with the embodiments of the present disclosure. It shall be understood that each flow and/or block in the flowcharts and/or block diagrams, as well as the combination of flows and/or blocks in the flowcharts and/or block diagrams may be implemented by computer program instructions. These computer program instructions may be offered to a universal computer, a dedicated computer, an embedded-type processor or the processing units of other programmable data processing equipment to generate a machine unit, thus a device for implementing the functions designated in one or a plurality of flows in the flowcharts and/or one or a plurality of blocks in the block diagrams is generated via instructions executed by computers or processing units of other programmable data processing equipment.

These computer program instructions may also be stored in a computer readable memory unit capable of enabling computers or other programmable data processing equipment to operate in a specific way, thus the manufactured products including an instruction device are generated by the instructions stored in the computer readable memory unit, and the instruction device implements the functions designated in one or a plurality of flows in the flowcharts and/or one or a plurality of blocks in the block diagrams.

These computer program instructions may also be loaded on computers or other programmable data processing equipment, thus a series of operation steps are executed on the computers or other programmable equipment to generate computer-implementable processing, so that the instructions executed on the computers or other programmable equipment provide the steps of implementing the functions designated in one or a plurality of flows in the flowcharts and/or one or a plurality of blocks in the block diagrams.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for rasterizing a transparent page, comprising:
   interpreting the transparent page to obtain graphic entities, transparency properties of the graphic entities, and profile information of the graphic entities;
   dividing the transparent page into a transparent area and a nontransparent area according to the transparency properties of the graphic entities;
   identifying, from the graphic entities, an overlapping graphic entity having an overlapping portion with the transparent area according to the profile information of the graphic entities; and
   dividing the transparent area into a de-transparentizing area and an ultimate transparent area by using the overlapping graphic entity,
   wherein dividing the transparent area into a de-transparentizing area and an ultimate transparent area comprises:
   generating a cell of the transparent area by using the overlapping graphic entity, the cell having a same graphic entity property;
   dividing the transparent area into the de-transparentizing area and the ultimate transparent area according to a type of the cell;

writing an area covered by the cell into the de-transparentizing area if the cell is a first type of cell or a second type of cell; and writing an area covered by the cell into the ultimate transparent area if the cell is a third type of cell, wherein:
the first type of cell is a cell only containing graph-type graphic entities;
the second type of cell is a cell only containing one image-type graphic entity or one shading-type graphic entity;
the third type of cell is a cell at least containing two types of graphic entities or at least containing two image-type graphic entities or two shading-type graphic entities.

2. The method according to claim 1, further comprising:
assembling the graphic entity in the de-transparentizing area, the graphic entity in the ultimate transparent area, and the graphic entity in the nontransparent area.

3. The method according to claim 2, wherein assembling the graphic entity in the de-transparentizing area, the graphic entity in the ultimate transparent area, and the graphic entity in the nontransparent area comprises:
assembling the graphic entity in the de-transparentizing area according to a substitute model;
assembling the graphic entity in the ultimate transparent area according to a transparent model; and
assembling the graphic entity in the nontransparent area according to the substitute model.

4. The method according to claim 2, wherein assembling the graphic entity in the de-transparentizing area, the graphic entity in the ultimate transparent area, and the graphic entity in the nontransparent area further comprises:
if output data is in 1-bit format, assembling the graphic entity in the ultimate transparent area, the graphic entity in the de-transparentizing area, and the graphic entity in the nontransparent area in different dot matrix spaces, respectively; and
if output data is in 8-bit format, assembling the graphic entity in the ultimate transparent area, the graphic entity in the de-transparentizing area, and the graphic entity in the nontransparent area are assembled in a same dot matrix space.

5. The method according to claim 2, wherein assembling the graphic entity in the de-transparentizing area, the graphic entity in the ultimate transparent area, and the graphic entity in the nontransparent area further comprises:
if output data is in 1-bit format, assembling the graphic entity in the de-transparentizing area and the graphic entity in the nontransparent area in an ultimately-output 1-bit page dot matrix space, and assembling the graphic entity in the ultimate transparent area in an 8-bit dot matrix space; and
if output data is in 8-bit format, assembling the graphic entity in the ultimate transparent area, the graphic entity in the de-transparentizing area, and the graphic entity in the nontransparent area in an ultimately-output 8-bit page dot matrix space.

6. The method according to claim 2, further comprising:
combining assembled data and outputting the combined data.

7. The method according to claim 6, wherein combining the assembled data and outputting the combined data comprises:
screening data in the ultimate transparent area as images;
assembling the data to an ultimately-output 1-bit page dot matrix space according to a substitute model; and
outputting the data assembled to the 1-bit page dot matrix space.

8. The method according to claim 1, further comprising:
performing transparent computing on the graphic entities in the cell, if the cell is the first type of cell, before the area covered by the cell is written into the de-transparentizing area, to obtain a cell graphic entity.

9. The method according to claim 8, further comprising:
assembling the graphic entity in the de-transparentizing area, the graphic entity in the ultimate transparent area, and the graphic entity in the nontransparent area.

10. The method according to claim 9, wherein assembling the graphic entity in the de-transparentizing area comprises:
if the graphic entity in the de-transparentizing area is an image-type graphic entity or an shading-type graphic entity,
performing transparent computing on the graphic entity in an original coordinate space of the graphic entity; and
assembling the graphic entity subjected to transparent computing according to a substitute model;
if the graphic entities in the de-transparentizing area is a cell graphic entity, assembling the cell graphic entity according to the substitute model.

11. The method according to claim 10, wherein assembling the graphic entity subjected to transparent computing according to the substitute model comprises:
if 1-bit data is output,
zooming the graphic entity from the original coordinate space to an equipment coordinate space and screening the graphic entity; and
assembling the screened graphic entity according to the substitute model; if 8-bit data is output,
zooming the graphic entity from the original coordinate space to the equipment coordinate space; and
assembling the zoomed graphic entity according to the substitute model.

12. A device for rasterizing a transparent page, comprising:
a page description language interpreting unit configured to:
interpret the transparent page to obtain graphic entities, transparency properties of the graphic entities, and profile information of the graphic entities; and
divide the transparent page into a transparent area and a nontransparent area according to the transparency properties of the graphic entities; and
a de-transparentizing unit configured to:
identify, from the graphic entities, an overlapping graphic entity having an overlapping portion with the transparent area according to the profile information of the graphic entities; and
divide the transparent area into a de-transparentizing area and an ultimate transparent area by using the graphic entities respectively having an overlapping portion with the transparent area,
wherein the de-transparentizing unit is further configured to:
generate a cell of the transparent area by using the overlapping graphic entity, the cell having a same graphic entity property;
divide the transparent area into the de-transparentizing area and the ultimate transparent area according to a type of the cell;
write an area covered by the cell into the de-transparentizing area if the cell is a first type of cell or a second type of cell; and
write an area covered by the cell into the ultimate transparent area if the cell is a third type of cell, wherein:
the first type of cell is a cell only containing graph-type graphic entities:
the second type of cell is a cell only containing one image-type graphic entity or one shading-type graphic entity;
the third type of cell is a cell at least containing two types of graphic entities or at least containing two image-type graphic entities or two shading-type graphic entities.

13. The device according to claim 12, further comprising:
an assembling unit configured to assemble the graphic entity in the de-transparentizing area, the graphic entity in the ultimate transparent area, and the graphic entity in the nontransparent area.

14. The device according to claim 13, wherein the assembling unit is further configured to:
assemble the graphic entity in the de-transparentizing area according to a substitute model;
assemble the graphic entity in the ultimate transparent area according to a transparent model; and
assemble the graphic entity in the nontransparent area according to the substitute model.

15. The device according to claim 13, further comprising:
an area data combining unit configured to combine assembled data and output the combined data.

16. The device according to claim 15, wherein the area data combining unit is further configured to:
screen data in the ultimate transparent area as images;
assemble the data to an ultimately-output 1-bit page dot matrix space according to a substitute model;
output the data assembled to the 1-bit page dot matrix space.

17. A non-transitory computer-readable storage medium with an executable program stored thereon, wherein the program, when executed by at least one processor, causes a computing device to perform operations comprising:
interpreting the transparent page to obtain graphic entities, transparency properties of the graphic entities, and profile information of the graphic entities;
dividing the transparent page into a transparent area and a nontransparent area according to the transparency properties of the graphic entities;
identifying, from the graphic entities, an overlapping graphic entity having an overlapping portion with the transparent area according to the profile information of the graphic entities; and
dividing the transparent area into a de-transparentizing area and an ultimate transparent area by using the overlapping graphic entity,
wherein dividing the transparent area into a de-transparentizing area and an ultimate transparent area comprises:
generating a cell of the transparent area by using the overlapping graphic entity, the cell having a same graphic entity property;
dividing the transparent area into the de-transparentizing area and the ultimate transparent area according to a type of the cell;
writing an area covered by the cell into the de-transparentizing area if the cell is a first type of cell or a second type of cell; and
writing an area covered by the cell into the ultimate transparent area if the cell is a third type of cell,
wherein:
the first type of cell is a cell only containing graph-type graphic entities;
the second type of cell is a cell only containing one image-type graphic entity or one shading-type graphic entity;
the third type of cell is a cell at least containing two types of graphic entities or at least containing two image-type graphic entities or two shading-type graphic entities.

* * * * *